United States Patent
Eo et al.

(10) Patent No.: US 10,047,828 B2
(45) Date of Patent: Aug. 14, 2018

(54) TRANSMISSION FOR VEHICLE

(71) Applicant: Hyundai Motor Company, Seoul (KR)

(72) Inventors: Soon Ki Eo, Ansan-si (KR); Chon Ok Kim, Yongin-si (KR); Chae Hong Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 253 days.

(21) Appl. No.: 14/855,095

(22) Filed: Sep. 15, 2015

(65) Prior Publication Data

US 2016/0215857 A1   Jul. 28, 2016

(30) Foreign Application Priority Data

Jan. 27, 2015   (KR) ........................ 10-2015-0013020

(51) Int. Cl.
*F16H 3/08*   (2006.01)
*F16H 3/00*   (2006.01)

(52) U.S. Cl.
CPC ....... *F16H 3/006* (2013.01); *F16H 2003/007* (2013.01)

(58) Field of Classification Search
CPC ...................... F16H 37/021; F16H 2003/0931
USPC .................................. 74/330, 331, 333, 340
See application file for complete search history.

(56) References Cited

U.S. PATENT DOCUMENTS

| 4,566,348 A | * | 1/1986 | Akashi | F16H 3/10 74/329 |
| 4,576,063 A | * | 3/1986 | Akashi | F16H 3/006 74/331 |
| 4,622,866 A | * | 11/1986 | Ito | F16H 3/10 192/48.6 |
| 7,347,116 B2 | | 3/2008 | Sakamoto et al. | |
| 8,677,860 B2 | * | 3/2014 | Nishida | B60K 6/36 74/665 B |
| 2014/0326093 A1 | * | 11/2014 | Martin | F16D 11/10 74/331 |

FOREIGN PATENT DOCUMENTS

| JP | 2001-99246 A | 4/2001 |
| JP | 2003-232412 A | 8/2003 |
| JP | 2004-293795 A | 10/2004 |
| JP | 2010-151303 A | 7/2010 |
| JP | 2014-211219 A | 11/2014 |
| KR | 10-2012-0043347 A | 5/2012 |
| KR | 10-2012-0108627 A | 10/2012 |
| WO | WO 2004/097266 A1 | 11/2004 |

* cited by examiner

*Primary Examiner* — Ha Dinh Ho
(74) *Attorney, Agent, or Firm* — Morgan, Lewis & Bockius LLP (57) ABSTRACT

A transmission for a vehicle may include a first input shaft selectively receiving power from an engine, a second input shaft continuously receiving power from the engine, an output shaft disposed in parallel with the first input shaft and the second input shaft, a first shift device making a series of gear shift ranges between the first input shaft and the output shaft, and a second shift device making, in duplicate, at least some of the gear shift ranges made by the first shift device between the second input shaft and the output shaft.

18 Claims, 13 Drawing Sheets

TRANSMISSION FOR VEHICLE

CROSS REFERENCE TO RELATED APPLICATION

The present application claims priority to Korean Patent Application Number 10-2015-0013020 filed Jan. 27, 2015, the entire contents of which is incorporated herein for all purposes by this reference.

BACKGROUND OF THE INVENTION

Field of the Invention

The present invention relates to a transmission for a vehicle. More particularly, the present invention relates to the configuration of a transmission that can automatically shift, based on a synchro-mesh type shifting mechanism that is generally used for manual transmissions.

Description of Related Art

In the related art, an Automated Manual Transmission (AMT) includes a clutch actuator for connecting/disconnecting a clutch and a shift actuator for engaging shift gears and disengaging desired shift gears and can automatically shift by operating the clutch actuator and the shift actuator in accordance with the driving states of a vehicle.

However, according to the AMT, it is required to cut torque from the clutch actuator to the AMT in order to disengage a previous shift gear and engage a new desired shift gear by operating the shift actuator, so interruption of torque that is supposed to be supplied to driving wheels from an engine is generated, which interferes with smooth shifting and deteriorates riding comfort.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle that can prevent deterioration of smooth shifting and riding comfort due to torque interruption, can be more conveniently mounted on a vehicle in a relatively simple and compact configuration, and can contribute to improving fuel efficiency.

According to various aspects of the present invention, a transmission for a vehicle may include a first input shaft selectively receiving power from an engine, a second input shaft continuously receiving power from the engine, an output shaft disposed in parallel with the first input shaft and the second input shaft, a first shift device making a series of gear shift ranges between the first input shaft and the output shaft, and a second shift device making, in duplicate, at least some of the gear shift ranges made by the first shift device between the second input shaft and the output shaft.

The first shift device may include a plurality of first unit driving gears rotatably disposed on the first input shaft, a plurality of driven gears engaged with the first unit driving gears, respectively, without rotating on the output shaft to make the gear shift ranges, and a plurality of first unit synchronizers disposed on the first input shaft and selectively allowing and preventing rotation of the first unit driving gears with respect to the first input shaft.

The second shift device may include a plurality of second unit driving gears rotatably disposed on the second input shaft, a plurality of driven gears engaged with the second unit driving gears, respectively, without rotating on the output shaft to make a plurality of gear shift ranges, and a plurality of second unit synchronizers disposed on the second input shaft and selectively allowing and preventing rotation of the second unit driving gears with respect to the second input shaft.

The driven gears on the output shaft of the first shift device and the driven gears on the output shaft of the second shift device may be the same and may be used in common for the first shift device and the second shift device.

Gear shift ranges made by the first shift device may be a series of gear shift ranges from a first gear shift range having a largest gear ratio and an n-th gear shift range having a smallest gear ratio, and duplicate gear shift ranges made by the second shift device may be first to m-th gear shift ranges, in which n and m may be natural numbers and m is less than or equal to n.

The first shift device may include a plurality of first unit driving gears for making all of gear shift ranges, some of the first unit driving gears that make the gear ratios of duplicate gear shift ranges made by the second shift device may be disposed non-rotatably on the first input shaft, and others may be rotatably disposed on the first input shaft, the second shift device may include a plurality of second unit driving gears disposed non-rotatably on the second input shaft to make the duplicate gear shift ranges, a plurality of driven gears making gear shift ranges by engaging with the first unit driving gears and the second unit driving gears may be disposed on the output shaft, and some of the driven gears that make the gear shift ranges made in duplicate by the first shift device and the second shift device may be rotatably disposed on the output shaft, and an output shaft synchronizer selectively allowing and preventing rotation of the rotatable driven gears with respect to the output shaft may be disposed on the output shaft.

In the driven gears rotatably disposed on the output shaft, the driven gears for making first to m−1-th duplicate gear shift ranges may be separately engaged with the first unit driving gears and the second unit driving gears, and the driven gear for making an m-th gear shift range in duplicate may be only one gear engaged in common with the first unit driving gear and the second unit driving gear.

The first input shaft may be connected to the engine through a clutch to selectively receive power from the engine.

A first idler may be rotatably disposed on the second input shaft to receive power from the engine through a clutch, a third idler may be integrally disposed on the first input shaft to receive power from the first idler, and a second idler may be configured to transmit power from the first idler to the third idler by engaging with the first idler and the third idler.

According to various aspects of the present invention, a transmission for a vehicle may include a first input shaft selectively receiving power from an engine, a second input shaft continuously receiving power from the engine, an output shaft disposed in parallel with the first input shaft and the second input shaft, a second shift device making a series of gear shift ranges in a synchro-mesh type between the second input shaft and the output shaft, and a first shift device making, in duplicate, at least some of the gear shift ranges made by the second shift device in a synchro-mesh type between the first input shaft and the output shaft.

The driven gears on the output shaft of the first shift device and the driven gears on the output shaft of the second shift device may be at least partially the same and may be used in common for the first shift device and the second shift device.

Gear shift ranges made by the second shift device may be a series of gear shift ranges from a first gear shift range having a largest gear ratio and an n-th gear shift range having a smallest gear ratio, and duplicate gear shift ranges made by the first shift device may be first to m-th gear shift ranges, in which n and m may be natural numbers, and m is less than or equal to n.

The second shift device may include a plurality of second unit driving gears for making all of the gear shift ranges, some of the second unit driving gears for making the same gear ratios as duplicate gear shift ranges made by the first shift device may be non-rotatably disposed on the second input shaft, and others may be rotatably disposed on the second input shaft, the first shift device may include a plurality of first unit driving gears disposed non-rotatably on the first input shaft to make the duplicate gear shift ranges, a plurality of driven gears making gear shift ranges by engaging with the first unit driving gears and the second unit driving gears may be disposed on the output shaft, and some of the driven gears that make the gear shift ranges made in duplicate by the first shift device and the second shift device may be rotatably disposed on the output shaft, and an output shaft synchronizer allowing and preventing rotation of the rotatable driven gears with respect to the output shaft may be disposed on the output shaft.

According to the present invention, the transmission for vehicle can prevent deterioration of smooth shifting and riding comfort due to torque interruption and has a relatively simple and compact configuration, so it can be easily mounted in a vehicle and can contribute to improving fuel efficiency.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
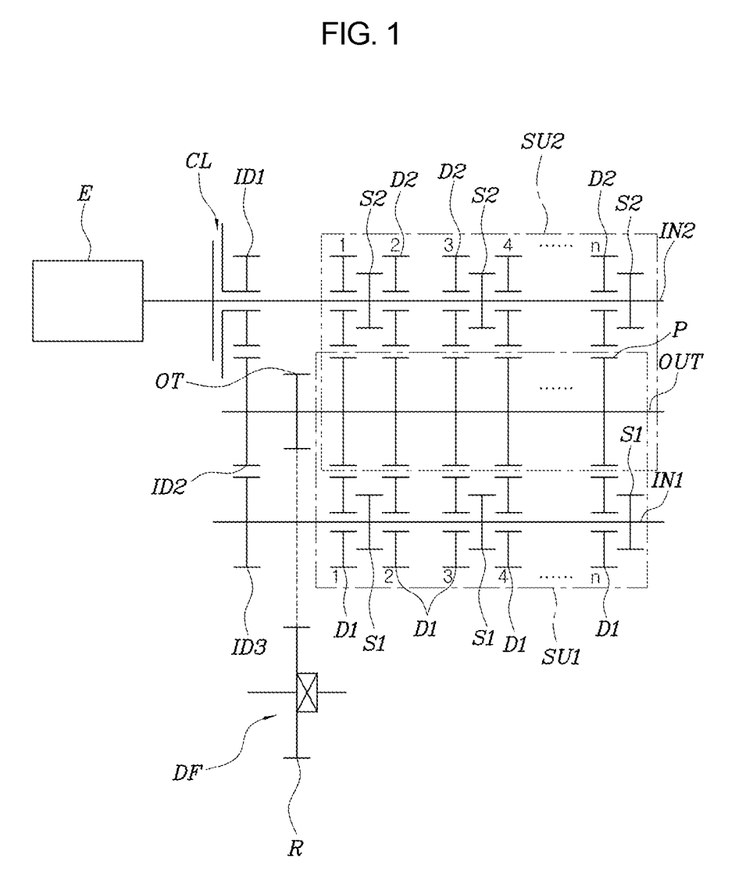
FIG. 1 is a diagram showing an exemplary transmission for a vehicle according to the present invention.
Figure 10:
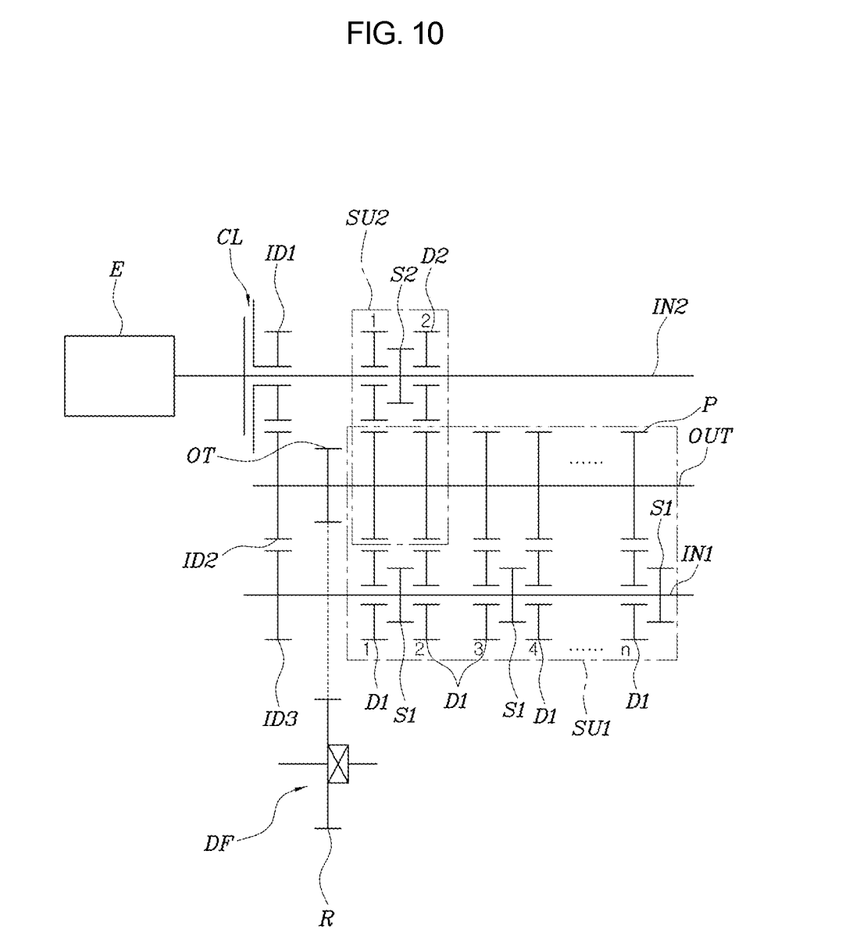
FIG. 10 is a diagram showing a configuration of an exemplary transmission for a vehicle according to the present invention.
Figure 11:
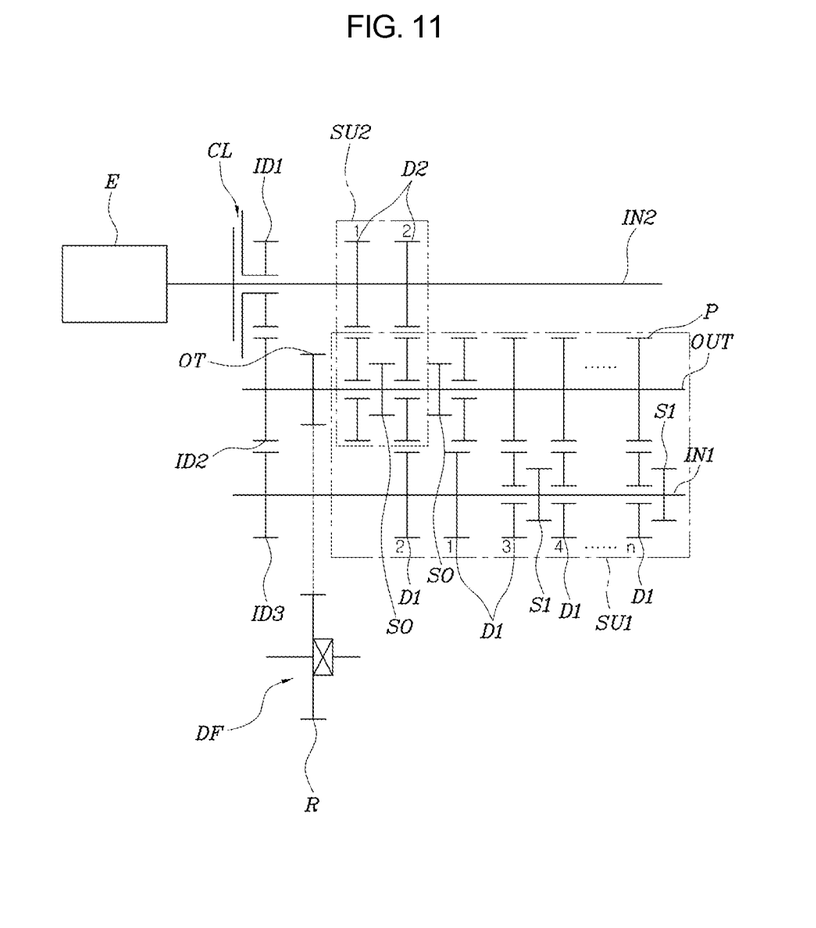
FIG. 11 is a diagram showing a configuration of an exemplary transmission for a vehicle according to the present invention.

The various embodiments shown in FIG. 1, the various embodiments shown in FIG. 10, and the various embodiments shown in FIG. 11, in common, include a first input shaft IN1 that selectively receives power from an engine E, a second input shaft IN2 that continuously receives power from the engine E, an output shaft OUT that is disposed in parallel with the first input shaft IN1 and the second input shaft IN2, a first shift device SU1 that makes a series of gear shift ranges in a synchro-mesh type between the first input shaft IN1 and the output shaft OUT, and a second shift device SU2 that makes, in duplicate, at least some of the gear shift ranges made by the first shift device SU1 in a synchro-mesh type between the second input shaft IN2 and the output shaft OUT.

That is, according to the transmission of the present invention, the power from the engine E can be transmitted to the output shaft OUT through a line from the first input shaft IN1 to the first shift device SU1 and another line from the second input shaft IN2 to the second shift device SU2, and particularly, the first shift device SU1 and the second shift device SU2 can make gear shift ranges having the same gear ratios in duplicate. Accordingly, the power from the engine E is shifted through both of the first shift device SU1 and the second shift device SU2 and transmitted to the output shaft OUT, or shifted through any one of the shift devices and then transmitted to the output shaft OUT.

The first input shaft IN1 is connected to the engine E through a clutch CL to selectively receive power from the engine E.

A first idler ID1 is rotatably disposed on the second input shaft IN2 to receive power from the engine E through the clutch CL, a third idler ID is integrally disposed on the first input shaft IN2 to receive power from the first idler ID1, and a second idler ID transmits power from the first idler ID1 to the third idler ID3 by engaging with the first idler ID1 and the third idler ID3.

Accordingly, the power from the engine is continuously supplied to the second input shaft IN2, but is transmitted to the first input shaft IN1 only when the clutch CL is engaged, and the first input shaft IN1 and the second input shaft IN2 rotate in the same direction.

The first shift device SU1 includes a plurality of first unit driving gears D1 rotatably disposed on the first input shaft IN1, a plurality of driven gears P engaged with the first unit driving gears D1, respectively, without rotating on the output shaft OUT to make the gear shift ranges, and a plurality of first unit synchronizers S1 disposed on the first input shaft IN1 and allowing and preventing rotation of the first unit driving gears D1 with respect to the first input shaft IN1.

That is, similar to synchro-mesh type transmissions of the related art, according to the first shift device SU1, the first unit driving gears D1 are continuously engaged with the driven gears P, respectively, to make predetermined gear ratios, in which when one of the first unit driving gears D1 is selectively connected to the first input shaft IN1 by the first unit synchronizers S1, the power from the engine E is shifted and transmitted to the output shaft OUT through the selected one of the first unit driving gears D1 and driven gear P.

Similarly, the second shift device SU2 includes a plurality of second unit driving gears D2 rotatably disposed on the second input shaft IN2, a plurality of driven gears P engaged with the second unit driving gears D2, respectively, without rotating on the output shaft OUT to make a plurality of gear shift ranges, and a plurality of second unit synchronizers S2 disposed on the second input shaft IN2 and allowing and preventing rotation of the second unit driving gears D2 with respect to the second input shaft IN2.

All of the gear shift ranges made by the first shift device SU1 are all of gear shift ranges required by a vehicle where the transmission is mounted, that is, a series of gear shift ranges from a first gear shift range having the largest gear ratio and an n-th gear shift range having the smallest gear ratio, and the duplicate gear shift ranges made by the second shift device SU2 are first to m-th gear shift ranges (n and m are natural numbers, m≤n).

In various embodiments shown in FIG. 1, the first shift device SU1 and the second shift device SU2 can make gear shift ranges (first to n-th gear shift ranges) in duplicate which is required by a vehicle where the transmission is mounted. However, in various embodiments shown in FIG. 10 and FIG. 11, respectively, the first shift device SU1 makes all of gear shift ranges required by a vehicle, but the second shift device SU2 makes, in duplicate, some gear shift ranges (first to m-th gear shift ranges) sequentially from the gear shift range having the largest gear ratio in the series of gear shift ranges made by the first shift device SU1.

That is, n=m in the various embodiments shown in FIG. 1, but in the various embodiments shown in FIG. 10 and FIG. 11, the second shift device SU2 makes only the first and second gear shift ranges in duplicate, so m=2 and m<n.

This is because the duplicate gear shift ranges made by the second shift device SU2 plays an important part in preventing torque interruption that is generated in shifting and the torque interruption influences smooth shifting and riding comfort when a vehicle is driven at a low speed with a relatively large gear ratio.

That is, for example, if a vehicle has six forward gear shift ranges, the ranges where there is a problem with smooth shifting or riding comfort due to torque interruption while the vehicle is driven are the first gear shift range to the third gear shift range, but torque interruption does not influence smooth shifting or riding comfort at higher gear shift ranges, because the speed and the inertia of the vehicle are substantially high and large at those ranges. Accordingly, the second shift device SU2 makes, in duplicate, first and second gear shift ranges having the same gear ratios as those of low gear shift ranges in order to improve torque interruption that may be generated at the first gear shift range to the third gear shift range.

Obviously, the number of duplicate gear shift ranges that are made by the second shift device SU2 may be increased or decreased in accordance with the design concept of a vehicle to be manufactured, but a plurality of duplicate gear shift ranges can be continuously made sequentially from the gear shift range having the largest gear ratio.

The driven gears P on the output shaft OUT of the first shift device SU1 and the driven gears P on the output shaft of the second shift device SU2 are at least partially the same, so they can be used in common for the first shift device SU1 and the second shift device SU2.

In the various embodiments shown in FIG. 1, the gear shift ranges made by the first shift device SU1 can be made in duplicate by the second shift device SU2 and the driven gears P for making the gear shift ranges are used in common by the first shift device SU1 and the second shift device SU2, so the weight of the transmission can be reduced as much as possible.

In the various embodiments shown in FIG. 10, the second shift device SU2 can make only the first and second gear shift ranges in duplicate and the driven gears P on the output shaft OUT for making the first and second gear shift ranges are the same as those used for making the first and second gear shift ranges by the first shift device SU1.

In the various embodiments shown in FIG. 11, the first shift device SU1 includes a plurality of first unit driving gears D1 for making all of the gear shift ranges, some of the first unit driving gears D1 that make the gear ratios of duplicate gear shift ranges made by the second shift device SU2 are disposed non-rotatably on the first input shaft IN1, and the others are rotatably disposed on the first input shaft IN1.

The second shift device SU2 includes a plurality of second unit driving gears D2 disposed non-rotatably on the second input shaft IN2 to make the duplicate gear shift ranges.

A plurality of driven gears P making gear shift ranges by engaging with the first unit driving gears D1 and the second unit driving gears D2 is disposed on the output shaft OUT, and some of the driven gears P that make the gear shift ranges made in duplicate by the first shift device SU1 and the second shift device SU2 are rotatably disposed on the output shaft OUT.

An output shaft synchronizer SO that allows and prevents rotation of the rotatable driven gears P with respect to the output shaft OUT is disposed on the output shaft OUT.

In the driven gears P rotatably disposed on the output shaft OUT, the driven gears P for making the first to m−1-th duplicate gear shift ranges are separately engaged with the first unit driving gears D1 and the second unit driving gears D2, and the driven gear P for making the m-th gear shift range in duplicate is only one gear engaged in common with the first unit driving gear D1 and the second unit driving gear D2.

That is, in the various embodiments shown in FIG. 11, the duplicate gear shift ranges are the first and second gear shift ranges, so m=2, and the driven gears P for making the first to the m−1-th duplicate gear shift ranges (as a result, the first gear shift range in these embodiments) are two gears on the output shaft OUT, the driven gear P for making the second gear shift range that is the m-th gear shift range is one gear and used in common by the first gear shift range SU1 and the second gear shift range SU2, so an increase in weight and volume of the transmission is minimized.

In this configuration, two driven gears P are provided for the m−1-th gear shift range, because power needs to be independently transmitted or not transmitted from the first gear shift range to the m−1-th gear shift range in order to prevent torque interruption within the first to m+1-th gear shift range, which is intended by the present invention.

For reference, in the various embodiments shown in FIG. 11, the first to the n-th gear shift ranges over the second gear shift range that are made in duplicate by the first shift device SU1 are made by a plurality of first unit synchronizers S1 on the first input shaft IN1, but they may be replaced by a plurality of output shaft synchronizers SO on the output shaft OUT.

Figure 12:
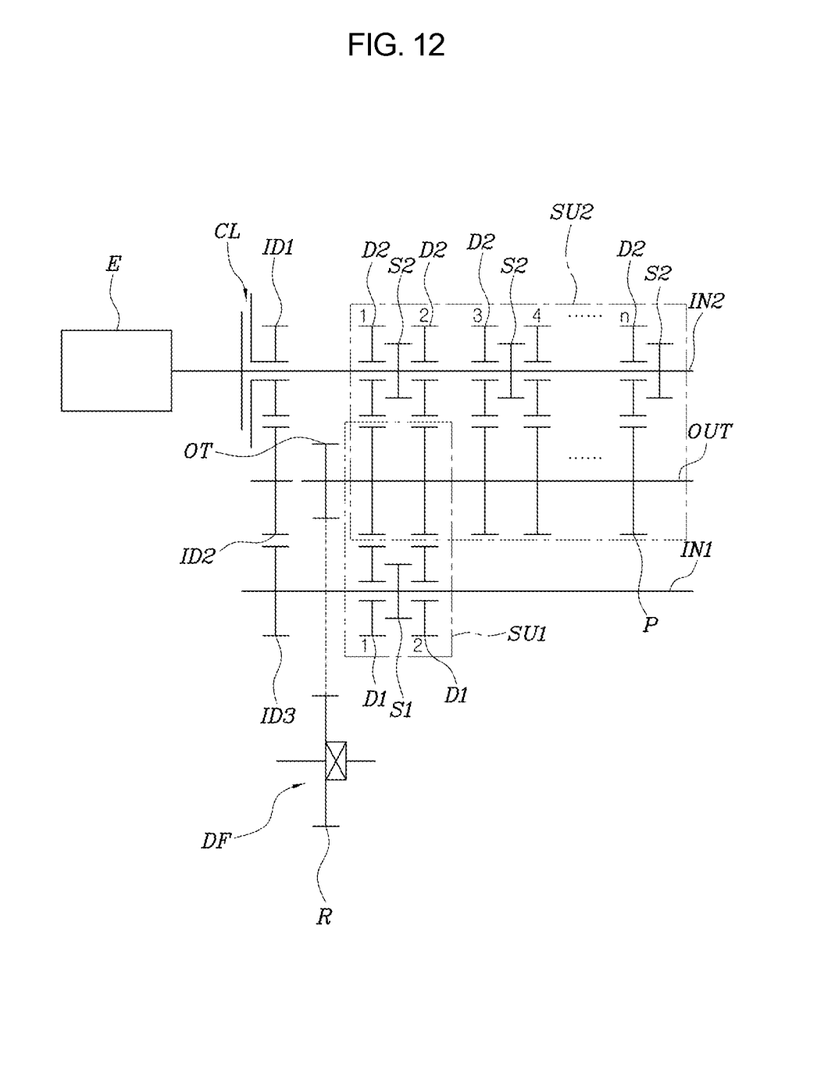
FIG. 12 is a diagram showing a configuration of an exemplary transmission for a vehicle according to the present invention.
Figure 13:
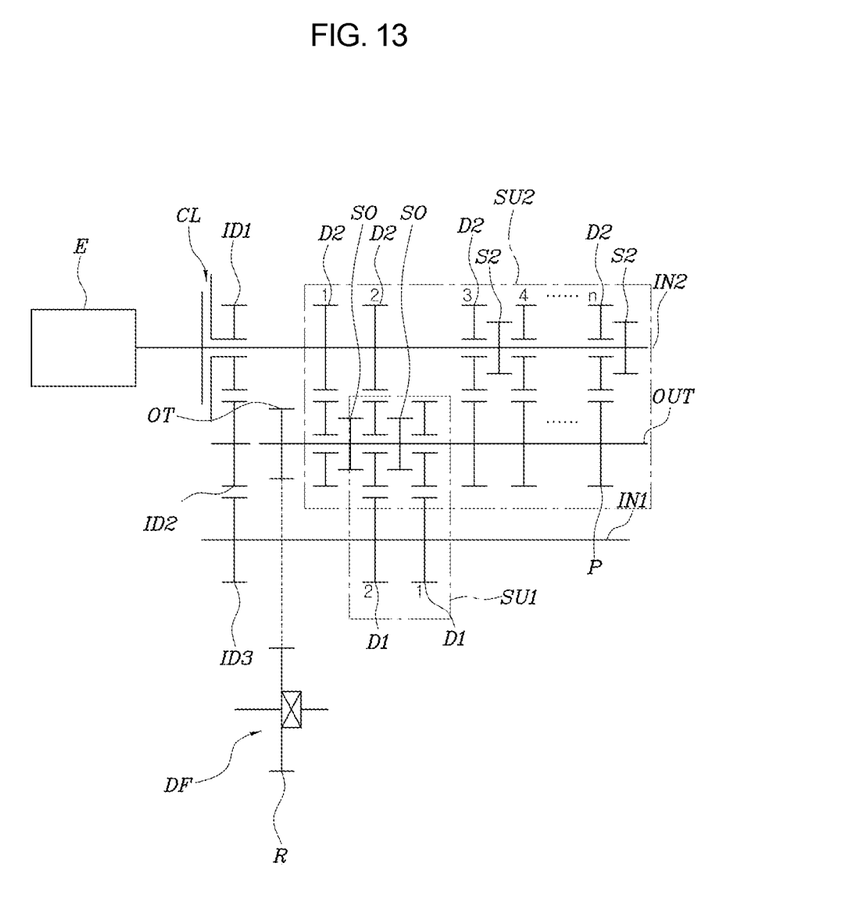
FIG. 13 is a diagram showing a configuration of an exemplary transmission for a vehicle according to the present invention.

The various embodiments shown in FIG. 12 and the various embodiments shown in FIG. 13 are configured by the same principle as the various embodiments shown in FIG. 10 and the various embodiments shown in FIG. 11, but are different only in that all of the gear shift ranges required by a vehicle are made by the second shift device SU2 and the duplicate gear shift ranges are made by the first shift device SU1.

That is, the various embodiments shown in FIG. 12, the embodiments shown in FIGS. 12 and 13, in common, include a first input shaft IN1 that selective receives power from an engine E, a second input shaft IN2 that continuously receives power from the engine E, an output shaft OUT that is disposed in parallel with the first input shaft IN1 and the second input shaft IN2, a second shift device SU2 that makes a series of gear shift ranges in a synchro-mesh type between the second input shaft IN2 and the output shaft OUT, and a first shift device SU1 that makes, in duplicate, at least some of the gear shift ranges made by the second shift device SU2 in a synchro-mesh type between the first input shaft IN1 and the output shaft OUT.

That is, in the various embodiments shown in FIG. 12, except that the second shift device SU2 makes all of the gear shift ranges required by a vehicle and the first shift device SU1 makes some of the gear shift ranges in duplicate, as described above, similar to the various embodiments shown in FIG. 10, the driven gears P on the output shaft OUT that are used to make the duplicate gear shift ranges by the first shift device SU1 are used in common by the second gear shift device SU2.

In the various embodiments shown in FIG. 13, all of the gear shift ranges made by the second shift device SU2 are a series of gear shift ranges from a first gear shift range having the largest gear ratio and an n-th gear shift range having the smallest gear ratio, and the duplicate gear shift ranges made by the first shift device SU1 are first to m-th gear shift ranges (n and m are natural numbers, m≤n).

The second shift device SU2 includes a plurality of second unit driving gears D2 for making all of the gear shift ranges, some of the second unit driving gears D2 for making the same gear ratios as the duplicate gear shift ranges made by the first shift device SU1 are non-rotatably disposed on the second input shaft IN2, and the others are rotatably disposed on the second input shaft IN2.

The first shift device SU1 includes a plurality of first unit driving gears D1 disposed non-rotatably on the first input shaft IN1 to make the duplicate gear shift ranges.

A plurality of driven gears P making gear shift ranges by engaging with the first unit driving gears D1 and the second unit driving gears D2 is disposed on the output shaft OUT, and some of the driven gears P that make the gear shift ranges made in duplicate by the first shift device SU1 and the second shift device SU2 are rotatably disposed on the output shaft OUT.

An output shaft synchronizer SO that allows and prevents rotation of the rotatable driven gears P with respect to the output shaft OUT is disposed on the output shaft OUT.

In the driven gears P rotatably disposed on the output shaft OUT, the driven gears P for making the first to m−1-th duplicate gear shift ranges are separately engaged with the first unit driving gears D1 and the second unit driving gears D2, and the driven gear P for making the m-th gear shift range in duplicate is only one gear engaged in common with the first unit driving gear D1 and the second unit driving gear D2.

That is, in the various embodiments shown in FIG. 13, the duplicate gear shift ranges are the first and second gear shift ranges, so m=2, and the driven gears P for making the first to the m−1-th duplicate gear shift ranges (as a result, the first gear shift range in these embodiments) are two gears on the output shaft OUT, the driven gear P for making the second gear shift range that is the m-th gear shift range is one gear and used in common by the first gear shift range SU1 and the second gear shift range SU2, so an increase in weight and volume of the transmission is minimized.

The operation of the various embodiments shown in FIG. 1 is described hereafter with reference to FIG. 2 to FIG. 9.

For reference, in FIG. 1, an output gear OT is on the output shaft OUT to be able to transfer power to a ring gear R of the differential DF.

FIG. 1 shows a neutral state, in which all the first unit synchronizers S1 and second unit synchronizers S2 are in the neutral state, so the engine E can be freely started regardless of whether the clutch CL is engaged or not.

Figure 2:
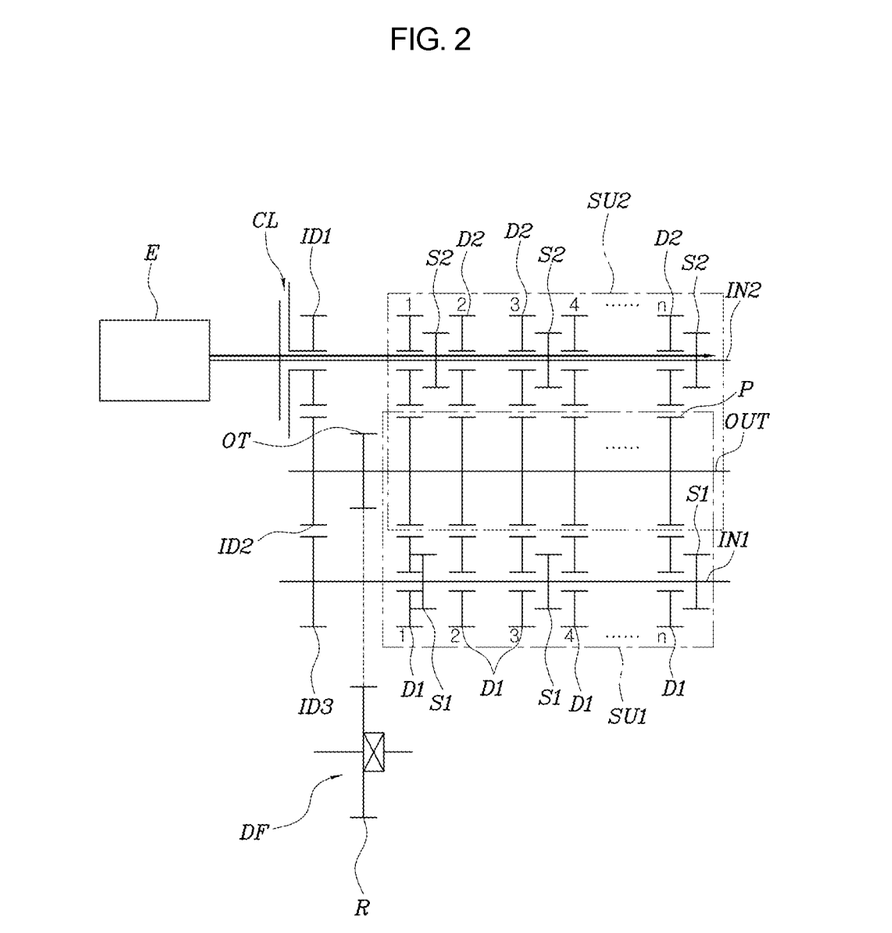
FIG. 2, FIG. 3, FIG. 4, and FIG. 5 are diagrams illustrating the operation of the transmission shown in FIG. 1 from a neutral state to a first gear-driving state.
Figure 3:
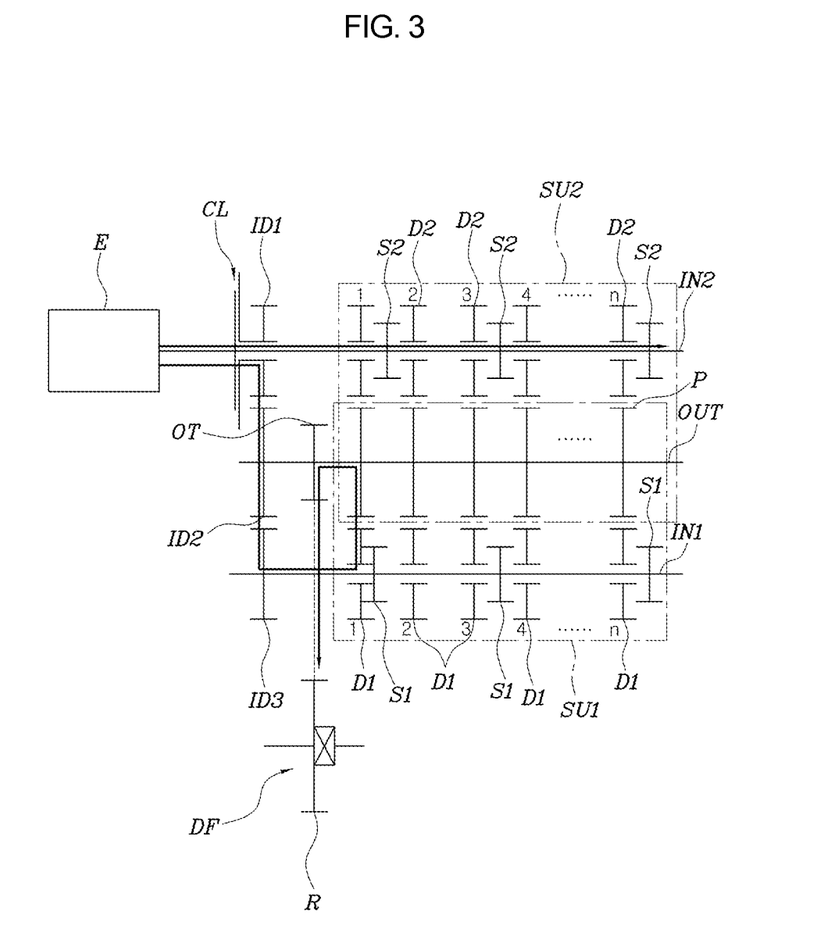

In the state shown in FIG. 1, after the engine E is started, the first gear shift range is engaged by the first shift device SU1, as in FIG. 2, and then when the clutch CL is engaged, as in FIG. 3, the power from the engine is shifted through the first shift device and outputted to the output shaft, so the vehicle is driven at the first gear shift range.

Figure 4:
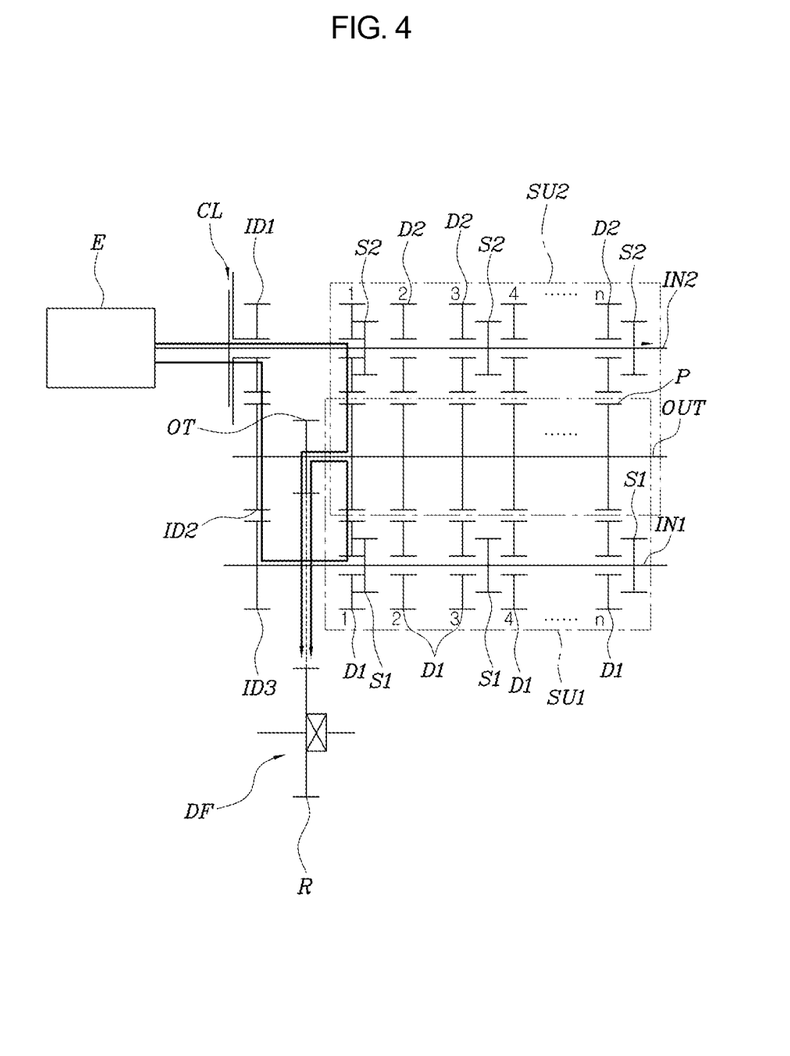

After the vehicle is started in the state shown in FIG. 3, the second shift device SU2 makes a first gear shift range in duplicate, as in FIG. 4. Accordingly, in this state, the power from the engine E is transferred to the output shaft OUT through both of the first shift device SU1 and the second shift device SU2.

Figure 5:
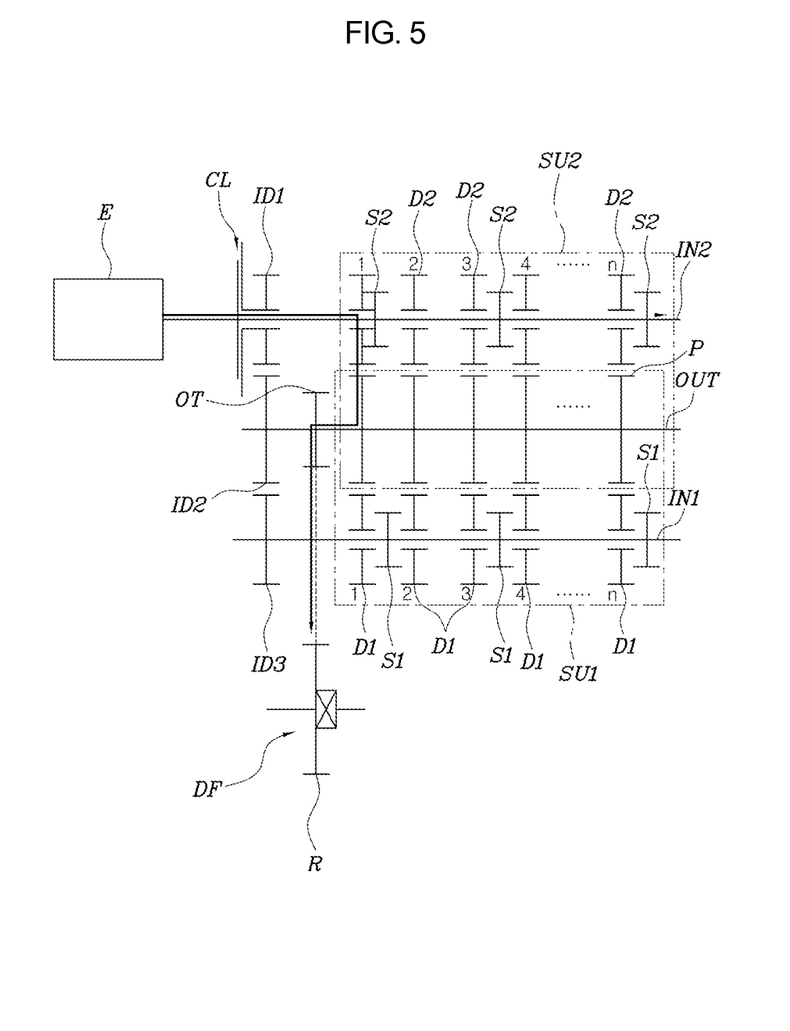

In the state shown in FIG. 5, the first gear shift range made by the first shift device SU1 requires to be shifted to neutral to prepare for shifting to the second gear shift range, in which, similarly, the power from the engine E keeps being supplied to the output shaft with the first duplicate gear shift range made by the second shift device SU2.

Figure 6:
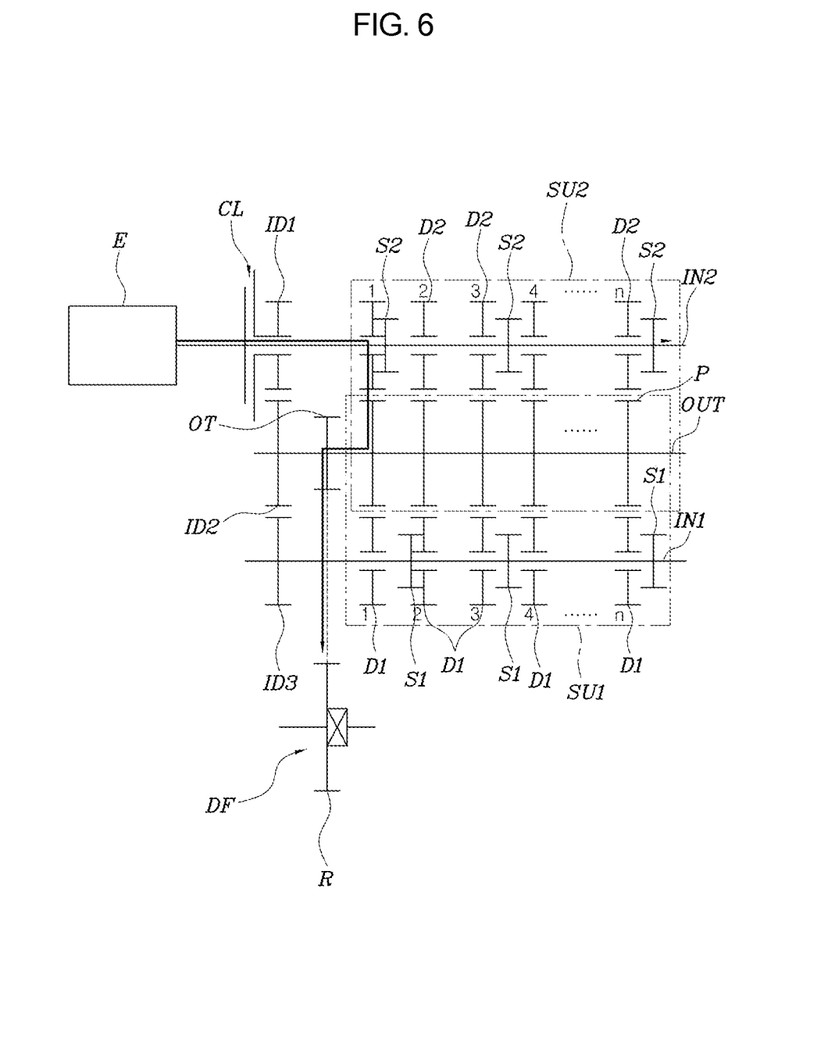
FIG. 6, FIG. 7, FIG. 8, and FIG. 9 are diagrams illustrating the operation of the transmission shown in FIG. 1 from the first gear-driving state to a second gear-driving state.

FIG. 6 shows a state when the clutch CL has been disengaged and the first shift device SU1 has made the second gear shift range from the state of FIG. 5, in which, similarly, the second input shaft IN2 directly receives the power from the engine E regardless of whether the clutch CL is disengaged or not, so the output at the first gear shift range by the second shift device SU2 keeps being transmitted to the differential DF through the output shaft OUT.

Figure 7:
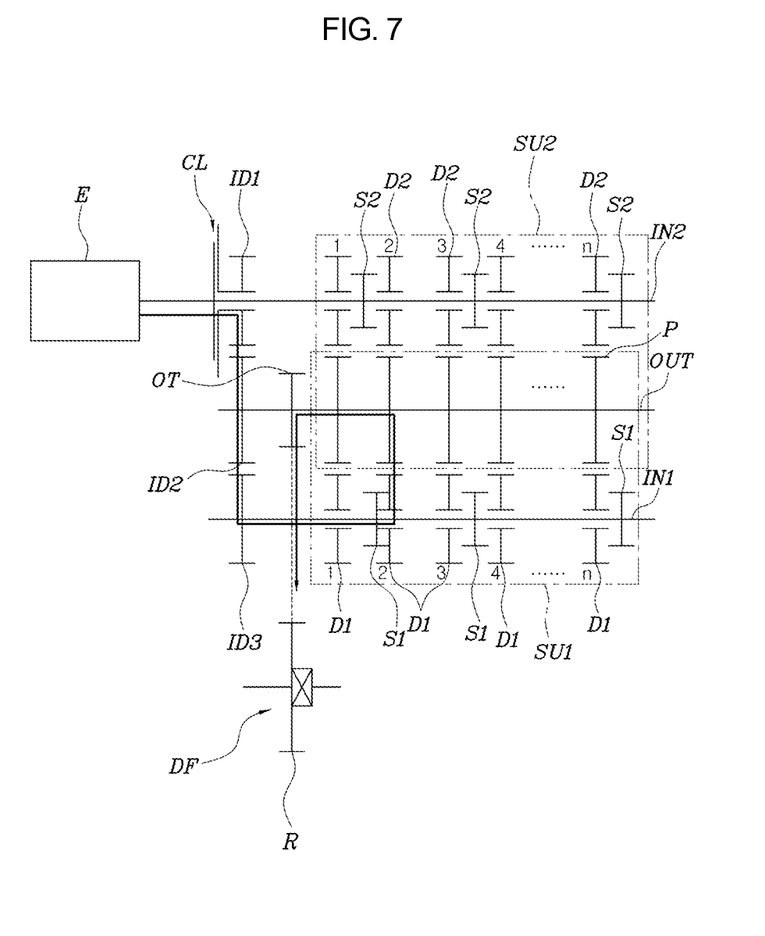

In FIG. 7, the clutch CL is engaged from the state shown in FIG. 6 and the first gear shift range engaged by the second shift device SU2 is disengaged. Further, power transmitted through the clutch CL starts to be supplied with the gear ratio of the second gear shift range to the output shaft OUT through the first shift device SU1 and the first gear shift range by the second shift device SU2 is disengaged, thereby shifting to the second gear shift range from the first gear shift range, in which power keeps being transmitted to the output shaft OUT without torque interruption, so smooth shifting is achieved and riding comfort is improved.

Figure 8:
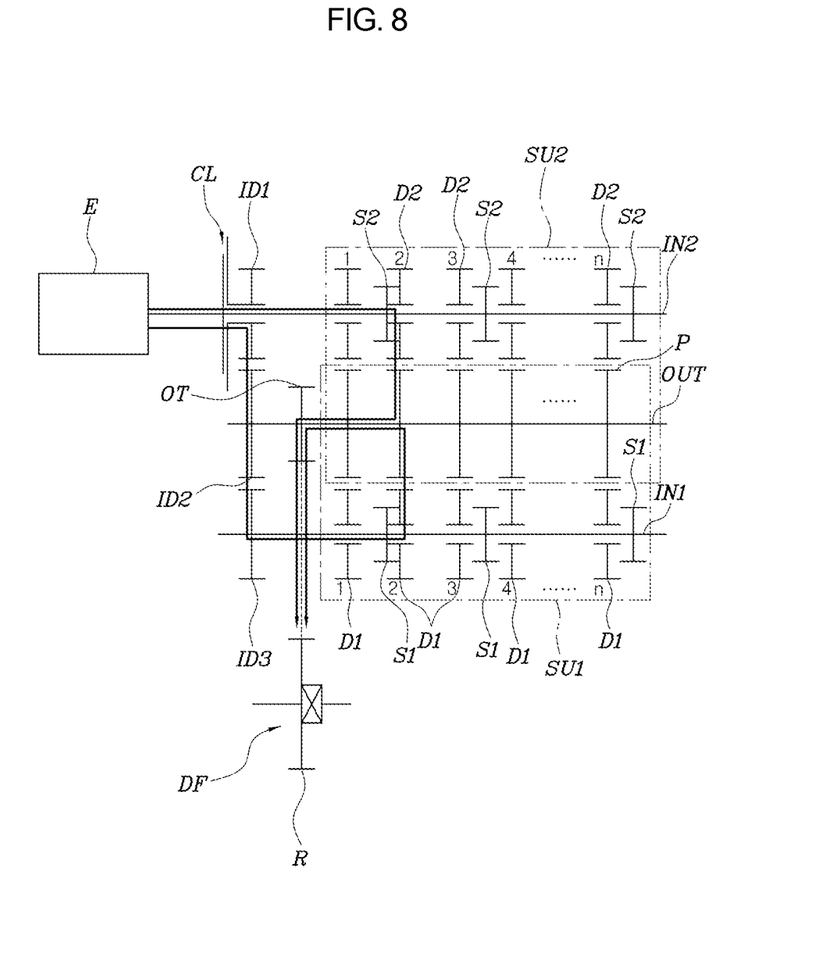

In the state shown in FIG. 8, the second gear shift range is engaged by the second shift device SU2 from the state of FIG. 7, so the power from the engine E is supplied with the gear ratio of the second gear shift range to the output shaft OUT through both of the first shift device SU1 and the second shift device SU2

Figure 9:
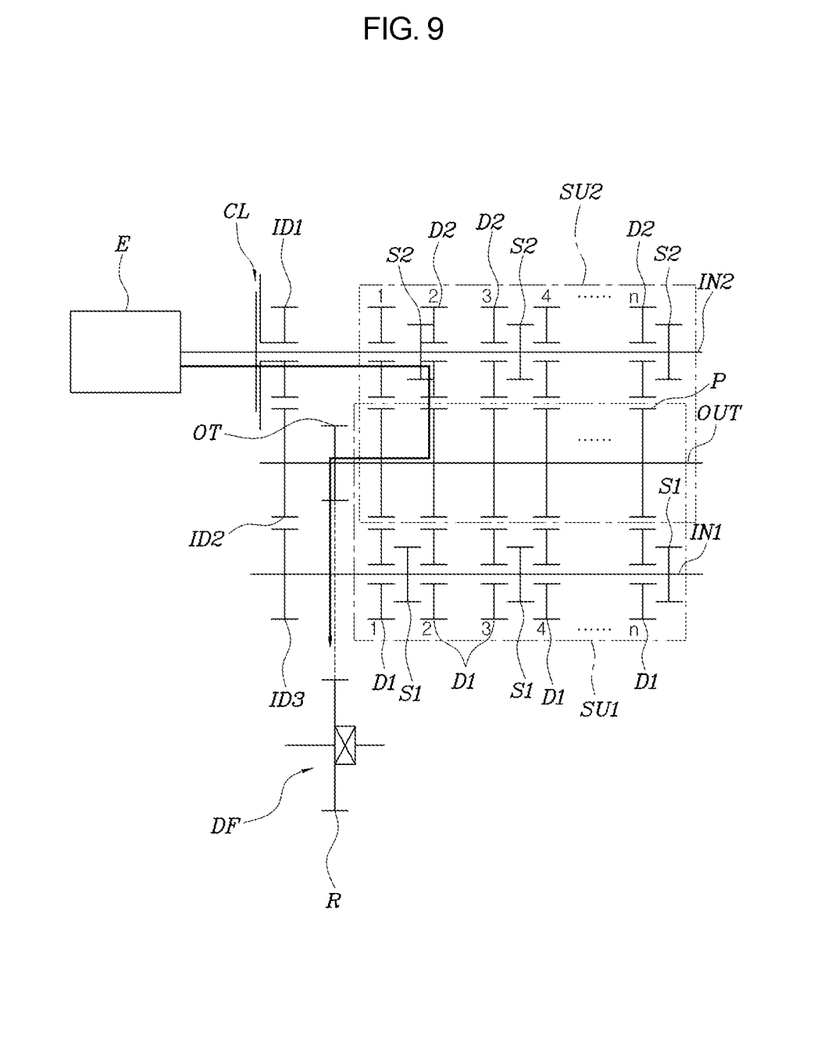

FIG. 9 shows a state when the second gear shift range by the first shift device SU1 is disengaged from the state of FIG. 8, in which preparing for shifting to the third gear shift range is performed, and similarly, the power from the engine E keeps transferred with the gear ratio of the second gear shift range to the output shaft OUT through the second shift device SU2.

Similar to shifting to the second gear shift range from the first gear shift range, shifting to the third gear shift range from the state shown in FIG. 9 can be performed without torque interruption by disengaging the clutch CL, engaging the third gear shift range through the first shift device SU1, and then engaging the clutch CL and disengaging the second gear shift range through the second shift device SU2.

Obviously, shifting to the fourth to the n-th gear shift range is performed in the same way, so in these embodiments, torque interruption is not generated in shifting to all the gear shift ranges. Further, in the various embodiments of FIG. 10-FIG. 13, only first and second gear shift ranges are duplicated, so torque interruption is prevented only in shifting to the first to the third gear shift ranges in the same way. However, although torque interruption is generated in shifting to the other higher gear shifting ranges, as in the related art, they are higher gear shift ranges, so it does not largely influence smooth shifting or riding comfort, as described above.

The operation of the various embodiments of FIG. 10-FIG. 13 is performed in the same way as the various embodiments of FIG. 1, so it is not described.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
   a first input shaft selectively receiving power from an engine;
   a second input shaft continuously receiving power from the engine;
   an output shaft disposed in parallel with the first input shaft and the second input shaft;
   a first shift device making a series of gear shift ranges between the first input shaft and the output shaft; and
   a second shift device making, in a same gear ratio, at least some of the gear shift ranges made by the first shift device between the second input shaft and the output shaft, wherein the second shift device includes at least a shift device mounted on the second input shaft.

2. The transmission of claim 1, wherein the first shift device includes:
   a plurality of first unit driving gears rotatably disposed on the first input shaft;
   a plurality of driven gears engaged with the first unit driving gears, respectively, without rotating on the output shaft to make the gear shift ranges; and
   a plurality of first unit synchronizers disposed on the first input shaft and selectively allowing and preventing rotation of the first unit driving gears with respect to the first input shaft.

3. The transmission of claim 2, wherein the second shift device includes:
   a plurality of driven gears engaged with the second unit driving gears, respectively, without rotating on the output shaft to make a plurality of gear shift ranges; and
   the at least a shift device including:
      a plurality of second unit driving gears rotatably disposed on the second input shaft; and
      a plurality of second unit synchronizers disposed on the second input shaft and selectively allowing and preventing rotation of the second unit driving gears with respect to the second input shaft.

4. The transmission of claim 3, wherein the driven gears on the output shaft of the first shift device and the driven gears on the output shaft of the second shift device are the same and are used in common for the first shift device and the second shift device.

5. The transmission of claim 1, wherein gear shift ranges made by the first shift device are a series of gear shift ranges from a first gear shift range having a largest gear ratio and an n-th gear shift range having a smallest gear ratio, and gear shift ranges having a same gear ratio made by the second shift device are first to m-th gear shift ranges, and
   wherein n and m are natural numbers, and m is less than or equal to n.

6. The transmission of claim 5,
   wherein the first shift device includes a plurality of first unit driving gears for making all of gear shift ranges, some of the first unit driving gears that make the gear ratios of gear shift ranges having the same gear ratio made by the second shift device are disposed non-rotatably on the first input shaft, and others are rotatably disposed on the first input shaft,
   wherein the second shift device includes a plurality of second unit driving gears disposed non-rotatably on the second input shaft to make the gear shift ranges having the same gear ratio,
   wherein a plurality of driven gears making gear shift ranges by engaging with the first unit driving gears and the second unit driving gears is disposed on the output shaft, and some of the driven gears that make the gear shift ranges made in a same gear ratio by the first shift device and the second shift device are rotatably disposed on the output shaft, and wherein an output shaft synchronizer selectively allowing and preventing rotation of the rotatable driven gears with respect to the output shaft is disposed on the output shaft.

7. The transmission of claim 6, wherein in the driven gears rotatably disposed on the output shaft, the driven gears for making first to m−1-th gear shift ranges having the same gear ratio are separately engaged with the first unit driving gears and the second unit driving gears, and the driven gear for making an m-th gear shift range in the same gear ratio is only one gear engaged in common with the first unit driving gear and the second unit driving gear.

8. The transmission of claim 1, wherein the first input shaft is connected to the engine through a clutch to selectively receive power from the engine.

9. The transmission of claim 5, wherein a first idler is rotatably disposed on the second input shaft to receive power from the engine through a clutch,
a third idler is integrally disposed on the first input shaft to receive power from the first idler, and
a second idler is configured to transmit power from the first idler to the third idler by engaging with the first idler and the third idler.

10. A transmission for a vehicle, comprising:
a first input shaft selectively receiving power from an engine;
a second input shaft continuously receiving power from the engine;
an output shaft disposed in parallel with the first input shaft and the second input shaft;
a second shift device making a series of gear shift ranges in a synchro-mesh type between the second input shaft and the output shaft, wherein the second shift device includes at least a shift device mounted on the second input shaft; and
a first shift device making, in a same gear ratio, at least some of the gear shift ranges made by the second shift device in a synchro-mesh type between the first input shaft and the output shaft.

11. The transmission of claim 10, wherein the second shift device includes:
a plurality of driven gears engaged with the second unit driving gears, respectively, without rotating on the output shaft to make a series of gear shift ranges; and
the at least a shift device including:
a plurality of second unit driving gears rotatably disposed on the second input shaft; and
a plurality of second unit synchronizers disposed on the second input shaft and allowing and preventing rotation of the second unit driving gears with respect to the second input shaft.

12. The transmission of claim 11, wherein the first shift device includes:
a plurality of first unit driving gears rotatably disposed on the first input shaft;
a plurality of driven gears engaged with the first unit driving gears, respectively, without rotating on the output shaft to make a plurality of gear shift ranges; and a plurality of first unit synchronizers disposed on the first input shaft and selectively allowing and preventing rotation of the first unit driving gears with respect to the first input shaft.

13. The transmission of claim 12, wherein the driven gears on the output shaft of the first shift device and the driven gears on the output shaft of the second shift device are at least partially the same and are used in common for the first shift device and the second shift device.

14. The transmission of claim 10, wherein gear shift ranges made by the second shift device are a series of gear shift ranges from a first gear shift range having a largest gear ratio and an n-th gear shift range having a smallest gear ratio, and gear shift ranges having a same gear ratio made by the first shift device are first to m-th gear shift ranges, and
wherein n and m are natural numbers, and m is less than or equal to n.

15. The transmission of claim 14,
wherein the second shift device includes a plurality of second unit driving gears for making all of the gear shift ranges, some of the second unit driving gears for making the same gear ratios as gear shift ranges having the same gear ratio made by the first shift device are non-rotatably disposed on the second input shaft, and others are rotatably disposed on the second input shaft,
wherein the first shift device includes a plurality of first unit driving gears disposed non-rotatably on the first input shaft to make the gear shift ranges having the same gear ratio,
wherein a plurality of driven gears making gear shift ranges by engaging with the first unit driving gears and the second unit driving gears is disposed on the output shaft, and some of the driven gears that make the gear shift ranges made in the same gear ratio by the first shift device and the second shift device are rotatably disposed on the output shaft, and
wherein an output shaft synchronizer allowing and preventing rotation of the rotatable driven gears with respect to the output shaft is disposed on the output shaft.

16. The transmission of claim 15, wherein in the driven gears rotatably disposed on the output shaft, the driven gears for making first to m−1-th gear shift ranges having the same gear ratio are separately engaged with the first unit driving gears and the second unit driving gears, and the driven gear for making an m-th gear shift range in the same gear ratio is only one gear engaged in common with the first unit driving gear and the second unit driving gear.

17. The transmission of claim 10, wherein the first input shaft is connected to the engine through a clutch to selectively receive power from the engine.

18. The transmission of claim 17, wherein a first idler is rotatably disposed on the second input shaft to receive power from the engine through a clutch,
a third idler is integrally disposed on the first input shaft to receive power from the first idler, and
a second idler is configured to transmit power from the first idler to the third idler by engaging with the first idler and the third idler.

* * * * *